United States Patent
Oh et al.

(10) Patent No.: US 8,045,606 B2
(45) Date of Patent: Oct. 25, 2011

(54) BIDIRECTIONAL EQUALIZER WITH IMPROVED EQUALIZATION EFFICIENCY USING VITERBI DECODER INFORMATION AND EQUALIZATION METHOD USING THE BIDIRECTIONAL EQUALIZER

(75) Inventors: Hae-sock Oh, Suwon-si (KR); Dong-seog Han, Daegu (KR)

(73) Assignees: SAMSUNG Electronics Co., Ltd., Suwon-si (KR); Educational Foundation of Kyungpook National University, Daegu (KR)

( * ) Notice: Subject to any disclaimer, the term of this patent is extended or adjusted under 35 U.S.C. 154(b) by 864 days.

(21) Appl. No.: 12/013,585

(22) Filed: Jan. 14, 2008

(65) Prior Publication Data

US 2008/0317112 A1 Dec. 25, 2008

(30) Foreign Application Priority Data

May 29, 2007 (KR) ........................ 10-2007-0052193

(51) Int. Cl.
*H03H 7/30* (2006.01)
*H03H 7/40* (2006.01)
*H03K 5/159* (2006.01)

(52) U.S. Cl. ........................................ 375/229; 375/232

(58) Field of Classification Search .................... 375/229
See application file for complete search history.

(56) References Cited

U.S. PATENT DOCUMENTS 5,930,296 A 7/1999 Kot
7,788,572 B1 * 8/2010 Ulriksson ...................... 714/795

FOREIGN PATENT DOCUMENTS

JP 8-149056 6/1996
KR 2002-93624 12/2002

OTHER PUBLICATIONS

Korean Office Action dated Jul. 23, 2008 in KR 2008-038560129.
IEEE Transactions on Consumer Electronics, vol. 53, No. 1, Feb. 2007, "Bidirectional Equalizer Arbitrated by Viterbi Decoder Path Metrics" Hae-Sock Oh et al.

* cited by examiner

*Primary Examiner* — David C. Payne
*Assistant Examiner* — Erin File
(74) *Attorney, Agent, or Firm* — Stanzione & Kim, LLP

(57) ABSTRACT

A bidirectional equalizer and an equalization method using the bidirectional equalizer. The bidirectional equalizer includes: a first equalizer to eliminate inter-symbol interference present in a data sequence transmitted from a transmitter and to generate a first candidate data sequence; a first time reverse operator to reverse the order of the transmitted data sequence and to generate a reversed data sequence; a second equalizer to eliminate inter-symbol interference present in the reversed data sequence and to generate a second candidate data sequence; a forward Viterbi decoder to receive the first candidate data sequence, and to decode and output the first candidate data sequence for every data symbol using a first minimum path metric calculated by a maximum likelihood (ML); a reverse Viterbi decoder to receive the second candidate data sequence, and to decode and output the second candidate data sequence for every data symbol using a second minimum path metric calculated by ML; a second time reverse operator to reverse the order of the decoded second candidate data sequence output from the reverse Viterbi decoder and to output the reversed decoded second candidate sequence; and an arbitrator to compare the first minimum path metric with the second minimum path metric, and to selectively output an output of the forward Viterbi decoder or an output of the second time reverse operator according to the comparison result.

19 Claims, 9 Drawing Sheets

| PROCEDURE | EXAMPLE |
|---|---|
| GENERATE RANDOM DATA SEQUENCE | 0 1 0 0 1 |
| ENCODE DATA SEQUENCE USING (2, 1) CONVOLUTIONALLY ENCODER | 00 11 10 00 01 |
| TRANSMIT ENCODED DATA SEQUENCE THROUGH CHANNEL | ASSUME IDEAL CHANNEL |
| REVERSE ORDER OF RECEIVED DATA SEQUENCE | 10 00 01 11 00 |
| REVERSE ORDER OF DATA SEQUENCE FOR EVERY 2 BITS | 01 00 10 11 00 |
| USE REVERSE VITERBI DECODING | USE REVERSE STATE DIAGRAM |
| REVERSE DATA SEQUENCE FOR EVERY 2 BITS | 10 00 01 11 00 |

BIDIRECTIONAL EQUALIZER WITH IMPROVED EQUALIZATION EFFICIENCY USING VITERBI DECODER INFORMATION AND EQUALIZATION METHOD USING THE BIDIRECTIONAL EQUALIZER

CROSS-REFERENCE TO RELATED APPLICATIONS

This application claims the benefit of Korean Patent Application No. 10-2007-0052193, filed on May 29, 2007, in the Korean Intellectual Property Office, the disclosure of which is incorporated herein in its entirety by reference.

BACKGROUND OF THE INVENTION

1. Field of the Invention

The present general inventive concept relates to a bidirectional equalizer, and more particularly, to a bidirectional equalizer, which can correctly select an output with the lowest error probability among outputs of a forward equalizer and a reverse equalizer without channel estimation, and an equalization method using the bidirectional equalizer.

2. Description of the Related Art

In general, a major factor degrading the performance of a high speed digital communication system is inter-symbol interference. The inter-symbol interference is caused by linear channel distortion, a multipath channel, abnormal frequency characteristics, and so on. Many studies have been conducted to reduce such inter-symbol interference caused by channel distortion, and channel equalizers, which can reduce bit detection error by compensating for a received signal passing through a distorted channel using a particular algorithm, have been developed.

Conventional channel equalizers use a method in which a transmitter transmits a training sequence, which is recognizable by a receiver, to the receiver for a predetermined period of time, and the receiver compares a received signal with an original signal and estimates the level of distortion of a channel. Also, the conventional channel equalizers perform equalization by continuously controlling tap coefficients using a least mean square (LMS) algorithm that is relatively simple to implement.

However, since the conventional channel equalizers are unidirectional, it is difficult for the conventional channel equalizers to effectively eliminate interference between pre-ghost symbols, and also end up amplifying a high frequency component while removing inter-symbol interference, resulting in increasing noise in a received signal. To solve the above listed problems, bidirectional equalizers have been suggested.

There are many types of bidirectional equalizers. Among them, bidirectional arbitrated decision-feedback (BAD) equalizers stand out for their high performance. For more information, see the study by A. C. Singer, U. Madhow, C. S. McGahey, and J. K. Nelson, entitled "Bidirectional Arbitrated Decision-Feedback Equalization", in IEEE Trans. Commun., vol. 53, no 2. 214-218, February 2005.

Conventional BAD equalizers use an algorithm that performs by: generating two candidate data sequences using a forward equalizer and a reverse equalizer; passing the generated candidate data sequences through an estimated channel and reconstructing a received signal; comparing the reconstructed received signal with an original received signal; and outputting an output with the lowest error probability based on the comparison result. Meanwhile, the conventional BAD equalizers use the impulse response characteristics of a training sequence to estimate a channel.

However, it is difficult for the conventional BAD equalizers to accurately estimate a channel due to a limitation in the length of a training sequence, and even more difficult to accurately estimate a channel when using training sequences received at regular intervals in a dynamic environment where channel characteristics change frequently. Accordingly, the conventional BAD equalizers have a high risk of error during the reconstruction of a received signal passed through an estimated channel.

SUMMARY OF THE INVENTION

The present general inventive concept provides a bidirectional equalizer, which can correctly select an output signal with the lowest error probability among output signals output from two equalizers using minimum path metrics or branch metrics, which are typically used to trace back a path in a Viterbi decoder, without channel estimation using a training sequence necessary for a conventional bi-directional arbitrated decision (BAD) equalizer, and an equalization method using the bidirectional equalizer.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are also achieved by providing a bidirectional equalizer including: a first equalizer to eliminate inter-symbol interference present in a data sequence transmitted from a transmitter and to generate a first candidate data sequence; a first time reverse operator reversing the order of the transmitted data sequence and to generate a reversed data sequence; a second equalizer to eliminate interference present in the reversed data sequence and to generate a second candidate data sequence; a forward Viterbi decoder to receive the first candidate data sequence, and to decode and output the first candidate data sequence for every data symbol using a first minimum path metric calculated by maximum likelihood (ML); a reverse Viterbi decoder to receive the second candidate data sequence, and to decode and output the second candidate data sequence for every data symbol using a second minimum path metric calculated by ML; a second time reverse operator to reverse the order of the decoded second candidate data sequence output from the reverse Viterbi decoder and to output the reversed decoded second candidate sequence; and an arbitrator to compare the first minimum path metric with the second minimum path metric, and to selectively output an output of the forward Viterbi decoder or an output of the second time reverse operator according to the comparison result.

The arbitrator may select the output of the forward Viterbi decoder when the first minimum path metric is less than the second minimum path metric, and select the output of the second time reverse operator when the first minimum path metric is greater than the second minimum path metric.

The first and second minimum path metrics may be determined based on a Hamming distance or a Euclidean distance.

The reverse Viterbi decoder may reverse the order of the second candidate data sequence for every K bits, decode the second candidate data sequence, which is reversed for every K bits, reverse the order of the decoded reversed second candidate data sequence for every K bits, and output the reversed decoded reversed second candidate data sequence where K is a natural number. The K bits may be 2 bits.

The bidirectional equalizer may further comprise a first delay element to deliver the transmitted data sequence to the first equalizer, and having a delay time equal to an operation time of the first time reverse operator; and a second delay element to deliver the output of the forward Viterbi decoder to the arbitrator, and having a delay time equal to an operation time of the second time reverse operator.

The foregoing and/or other aspects and utilities of the present general inventive concept may also be achieved by providing a bidirectional equalizer comprising: a first equalizer to eliminate inter-symbol interference present in a data sequence transmitted from a transmitter and to generate a first candidate data sequence; a first time reverse operator to reverse the order of the transmitted data sequence and to generate a reversed data sequence; a second equalizer to eliminate inter-symbol interference present in the reversed data sequence and to generate a second candidate data sequence; a first forward Viterbi decoder to receive the first candidate data sequence, and to output a first minimum path metric calculated by ML when the first candidate data sequence is decoded for every data symbol; a reverse Viterbi decoder to receive the second candidate data sequence, and to output a second minimum path metric calculated by ML when the second candidate data sequence is decoded for every data symbol; a second time reverse operator to reverse the order of the second candidate data sequence and to output the reversed second candidate data sequence; and an arbitrator to compare the first minimum path metric with the second minimum path metric, and to select and output an output of the first equalizer or an output of the second time reverse operator according to the comparison result.

The bidirectional equalizer may further comprise a second forward Viterbi decoder to receive an output from the arbitrator, and to decode and output the output of the arbitrator for every data symbol using a third minimum path metric calculated by ML.

The bidirectional equalizer may further comprise: a first deciding unit to quantize and output an output of the first equalizer; and a second deciding unit to quantize and output an output of the second time reverse operator, wherein the arbitrator selects and outputs an output of the first deciding unit or an output of the second deciding unit.

The foregoing and/or other aspects and utilities of the present general inventive concept may also be achieved by providing a bidirectional equalizer comprising: a first equalizer to eliminate inter-symbol interference present in a data sequence transmitted from a transmitter and to generate a first candidate data sequence; a first time reverse operator to reverse the order of the transmitted data sequence and to generate a reversed data sequence; a second equalizer to eliminate inter-symbol interference present in the reversed data sequence and to generate a second candidate data sequence; a first forward Viterbi decoder to receive the first candidate data sequence, and to decode and output the first candidate data sequence for every data symbol using a first branch metric calculated by ML; a reverse Viterbi decoder to receive the second candidate data sequence, and to decode and output the second candidate data sequence using a second branch metric calculated by ML; a second time reverse operator to reverse the order of the second candidate data sequence and output the reversed second candidate data sequence; and an arbitrator to compare the first branch metric with the second branch metric, and to select and output an output of the first equalizer or an output of the second time reverse operator according to the comparison result.

The foregoing and/or other aspects and utilities of the present general inventive concept may also be achieved by providing an equalization method comprising: (a) eliminating inter-symbol interference present in a data sequence transmitted from a transmitter and outputting the data sequence; (b) reversing the order of the transmitted data sequence and generating a reversed data sequence; (c) eliminating inter-symbol interference present in the reversed data sequence and outputting the reversed data sequence; (d) decoding and outputting the data sequence output in operation (a) for every data symbol using a first minimum path metric calculated by ML; (e) decoding and outputting the data sequence output in operation (c) for every data symbol using a second minimum path metric calculated by ML; (f) reversing the order of the data sequence output in operation (e) and outputting the reversed data sequence; (g) comparing the first minimum path metric with the second minimum path metric; and (h) selecting and outputting a data symbol generated in operation (d) or a data symbol generated in operation (f) according to the comparison result.

The foregoing and/or other aspects and utilities of the present general inventive concept may also be achieved by providing an equalization method comprising: (a) eliminating inter-symbol interference present in a data sequence transmitted from a transmitter and outputting the data sequence; (b) reversing the order of the transmitted data sequence and generating a reversed data sequence; (c) eliminating inter-symbol interference present in the reversed data sequence and outputting the reversed data sequence; (d) outputting a first minimum path metric calculated by ML for every data symbol, when decoding the data sequence output in operation (a); (e) outputting a second minimum path metric calculated by ML for every data symbol, when decoding the data sequence output in operation (c); (f) reversing the order of the data sequence output in operation (e) and outputting the reversed data sequence; (g) comparing the first minimum path metric with the second minimum path metric; and (h) selecting and outputting a data symbol generated in operation (a) or a data symbol generated in operation (f) according to the comparison result.

The foregoing and/or other aspects and utilities of the present general inventive concept may also be achieved by providing an equalization method comprising: (a) eliminating inter-symbol interference present in data sequence transmitted from a transmitter and outputting the data sequence; (b) reversing the order of the transmitted data sequence and generating a reversed data sequence; (c) eliminating inter-symbol interference present in the reversed data sequence and outputting the reversed data sequence; (d) outputting a first branch metric calculated by ML for every data symbol, when decoding the data sequence output in operation (a); (e) outputting a second branch metric calculated by ML for every data symbol, when decoding the data sequence output in operation (c); (f) reversing the order of the data sequence output in operation (e) and outputting the reversed data sequence; (g) comparing the first branch metric with the second branch metric; and (h) selecting and outputting a data symbol generated in operation (a) or a data symbol generated in operation (f) according to the comparison result.

BRIEF DESCRIPTION OF THE DRAWINGS

The above and other aspects and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
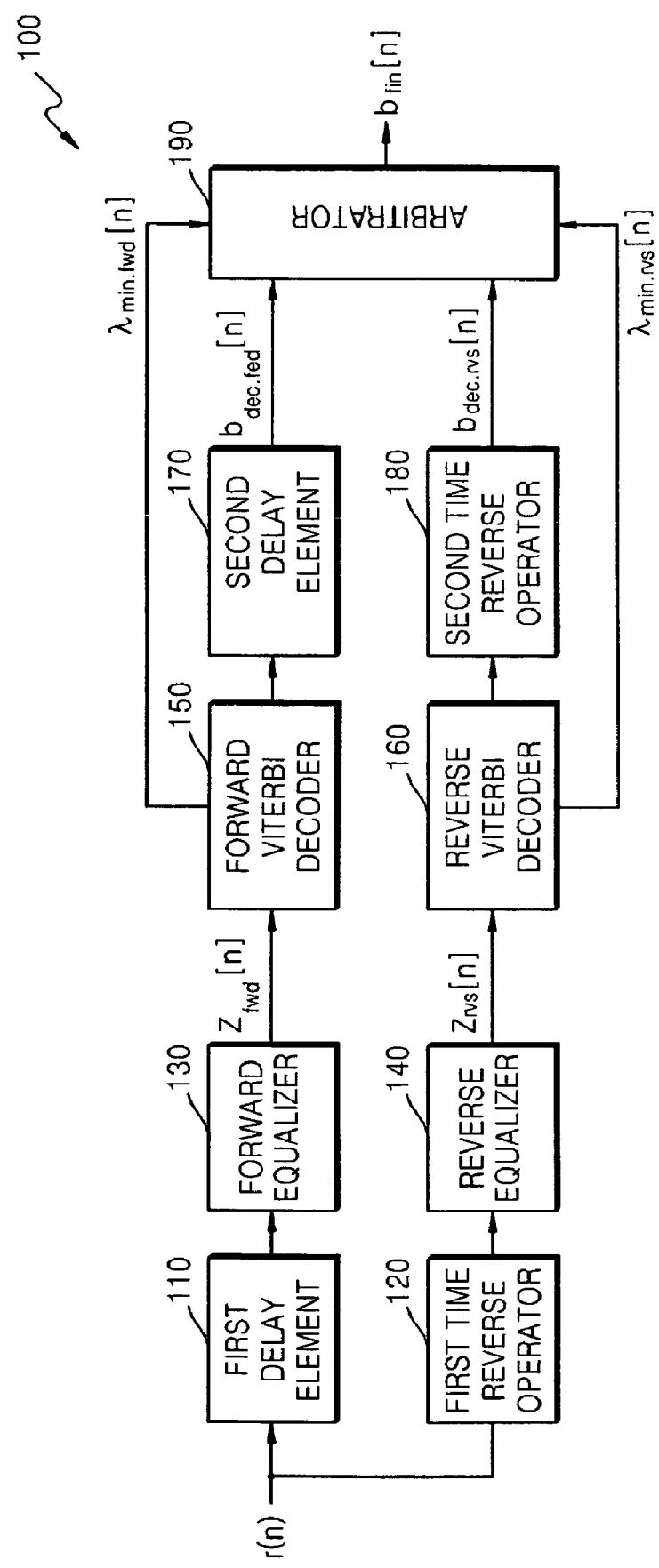
FIG. 1 is a block diagram of a bidirectional equalizer according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of a bidirectional equalizer 100 according to an embodiment of the present general inventive concept.

Referring to FIG. 1, the bidirectional equalizer 100 includes a first delay element 110, a first time reverse operator 120, a forward equalizer 130, a reverse equalizer 140, a forward Viterbi decoder 150, a reverse Viterbi decoder 160, a second delay element 170, a second time reverse operator 180, and an arbitrator 190.

The first delay element 110 delays a data sequence transmitted from the outside for a predetermined period of time, and compensates for a delay through the first time reverse operator 120. The first time reverse operator 120 reverses the order of a received data sequence in time and outputs the reversed data sequence. For example, when bits included in one frame data are input in a predetermined order, the first time reverse operator 120 outputs all the bits included in the frame data in a reverse order opposite to the predetermined order.

The forward equalizer 130 eliminates inter-symbol interference from a data sequence received from the first delay element 110. In particular, the forward equalizer 130 can effectively eliminate post-ghosts, which are signals arriving after a signal passing through a main path among signals arriving at a receiver (not shown). The forward equalizer 130 outputs a first candidate data sequence $Z_{fwd}[n]$ which is an equalized signal.

The reverse equalizer 140 eliminates inter-symbol interference from a data sequence received from the first time reverse operator 120. In particular, the reverse equalizer 140 can effectively eliminate pre-ghosts, which are signals arriving before the signal passing through the main path among the signals arriving at the receiver. The reverse equalizer 140 outputs a second candidate data sequence $Z_{rvs}[n]$, which is an equalized signal.

The forward Viterbi decoder 150 decodes the first candidate data sequence $Z_{fwd}[n]$ received from the forward equalizer 130 for every data symbol, outputs the decoded first candidate data sequence to the second delay element 170, and outputs a first minimum path metric $\lambda_{min.fwd}$ used in decoding each data symbol to the arbitrator 190.

Accordingly, when the first candidate data sequence $Z_{fwd}[n]$ consists of n data symbols, the forward Viterbit decoder 150 outputs n first minimum path metrics $\lambda_{min.fwd}[n]$ to the arbitrator 190. However, the forward Viterbi decoder 150 may output branch metrics used in decoding the data symbols to the arbitrator 190. The first minimum path metric $\lambda_{min.fwd}$ may vary depending on its corresponding data symbol.

The reverse Viterbi decoder 160 decodes the second candidate data sequence $Z_{rvs}[n]$ received from the reverse equalizer 140 for every data symbol, outputs the decoded second candidate data sequence to the second time reverse operator 180, and outputs a second minimum path metric $\lambda_{min.rvs}$ used in decoding each data symbol to the arbitrator 190.

Accordingly, when the second candidate data sequence $Z_{rvs}[n]$ consists of n data symbols, the reverse Viterbi decoder 160 outputs n second minimum path metrics $(\lambda_{min.rvs})$ to the arbitrator 190. However, the reverse Viterbi decoder 160 may output branch metrics used in decoding the data symbols to the arbitrator 190. The second minimum path metric $\lambda_{min.rvs}$ varies depending on its corresponding data symbol.

Also, the reverse Viterbi decoder 160 may reverse the order of the second candidate data sequence $Z_{rvs}[n]$ received from the reverse equalizer 140 for every K bits where K is a natural number, decode the second candidate data sequence, which is reversed for every K bits, for every data symbol using a maximum likelihood (ML), reverse the decoded reversed second candidate data sequence for every K bits, and output the reversed decoded reversed second candidate data. Here, the K bits may be 2 bits.

In general, Viterbi decoders, which decode convolutionally encoded data, are often used when the quality of a transmission path is poor or the strength of a transmitted signal is limited. The Viterbi decoders decode encoded data sequences using the ML or maximum posteriori probability.

In detail, the Viterbi decoders use a Viterbi algorithm that finds a path with the largest log-likelihood function among a plurality of paths on a trellis diagram, traces back the found path, and estimates a transmitted data sequence. Accordingly, since the Viterbi decoders use a simple method which eliminates least likely paths and finds an optimal path metric, the Viterbi decoders are often used when a constrain length is short.

Meanwhile, in order to trace back a path of received data, the Viterbi algorithm comprises operations of comparing data input through a specific path with the received data in each state and selecting a survivor path in each state according to the comparison result. Accordingly, information on minimum path metrics becomes an indicator of how correct the received data is. That is, the degree of correctness of received signals can be determined by comparing minimum path metrics. The minimum path metrics are determined based on a Hamming distance or a Euclidean distance.

The second delay element 170 delays the decoded first candidate data sequence received from the forward Viterbi decoder 150 for a predetermined period of time, and compensates for a delay through a second time reverse operator 180. The second time reverse operator 180 reverses the order of the decoded second candidate data sequence received from the reverse Viterbi decoder 160 in time and outputs the reversed decoded second candidate data sequence. The second time reverse operator 180 is structurally identical to the first time reverse operator 120.

The arbitrator 190 receives a first decided candidate data sequence $b_{dec.fwd}[n]$ consisting of n data symbols from the second delay element 170, and receives a second decided candidate data sequence $b_{dec.rvs}[n]$ consisting of n data symbols from the second time reverse operator 180. Also, the arbitrator 190 receives the n first minimum path metrics $\lambda_{min.fwd}[n]$ from the forward Viterbi decoder 150, and receives the n second minimum path metrics $\lambda_{min.rvs}[n]$ from the reverse Viterbi decoder 160.

In outputting the respective data symbols, the arbitrator 190 compares the first minimum path metrics $\lambda_{min.fwd}$ with the second minimum path metrics $\lambda_{min.rvs}$, and selects and outputs one data symbol contained in the first decided candidate data sequence $b_{dec.fwd}[n]$ or one data symbol contained in the second decided candidate data sequence $b_{dec.rvs}[n]$. Accordingly, the arbitrator 190 makes n comparisons and n choices to output a finally decided data sequence $b_{fin}[n]$. The finally decided data sequence $b_{fin}[n]$ is a signal with the lowest error probability.

Figure 2:
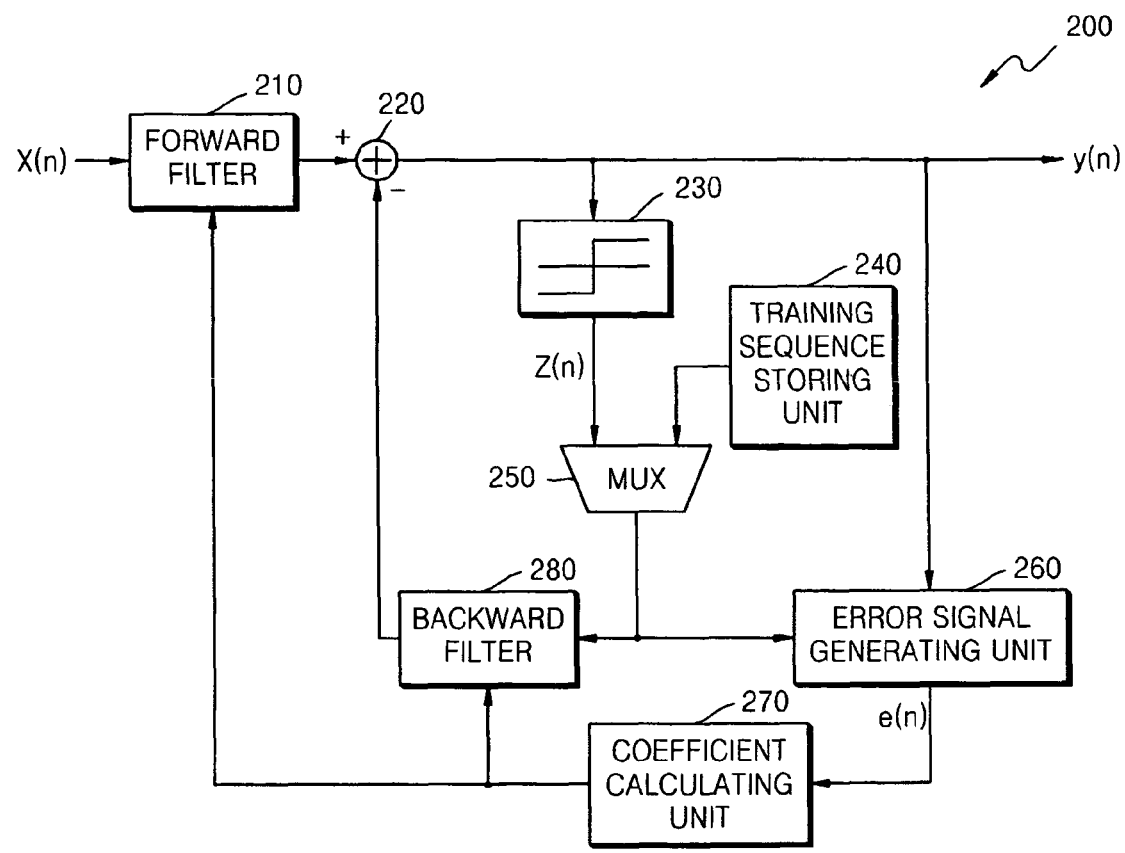
FIG. 2 is a block diagram of a forward equalizer of the bidirectional equalizer of FIG. 1.

FIG. 2 is a block diagram of an exemplary embodiment of a forward equalizer 200 of the bidirectional equalizer 100 of FIG. 1.

The forward equalizer 200 of FIG. 2 includes a forward filter 210, a subtractor 220, a deciding unit 230, a training sequence storing unit 240, a multiplexer 250, an error signal generating unit 260, a coefficient calculating unit 270, and a backward filter 280. The forward equalizer 200 may be a decision feedback equalizer (DFE). Also, the reverse equalizer 140 illustrated in FIG. 1 may be structurally identical to the forward equalizer 200.

The forward filter 210 eliminates pre-ghosts among input signals x(n), and the backward filter 280 eliminates post-ghosts among input signals thereto. The forward filter 210 and the backward filter 280 are finite impulse response (FIR) filters, and a filter tap coefficient is adjusted according to channel characteristics.

The subtractor 220 subtracts an output of the backward filter 280 from an output of the forward filter 210 and outputs a signal y(n) from which inter-symbol interference is eliminated. The deciding unit 230 quantizes the signal y(n) from which inter-symbol interference is eliminated using a slicer and outputs a quantized signal z(n).

The multiplexer 250 outputs a training sequence output from the training sequence storing unit 240 or a decided signal z(n) output from the deciding unit 230 according to a mode control signal. The signal output from the multiplexer 250 is input to the backward filter 280 and the error signal generating unit 260.

The error signal generating unit 260 subtracts the signal y(n) from which inter-symbol interference is eliminated from the training sequence or the decided signal z(n) received from the multiplexer 250 and generates an error signal e(n). The operation of the multiplexer 250 can be controlled according to a control signal output from a mode control unit (not shown).

The coefficient calculating unit 270 calculates a forward coefficient $a_k(n)$ and a backward coefficient $b_k(n)$ that relate to produce the least mean squares of the error signal e(n), and provides the calculated forward coefficient $a_k(n)$ and backward coefficient $b_k(n)$ to the forward filter 210 and the backward filter 280. The coefficient calculating unit 270 may use a least mean square (LMS) algorithm to obtain the forward coefficient $a_k(n)$ and the backward coefficient $b_k(n)$.

Figure 3:
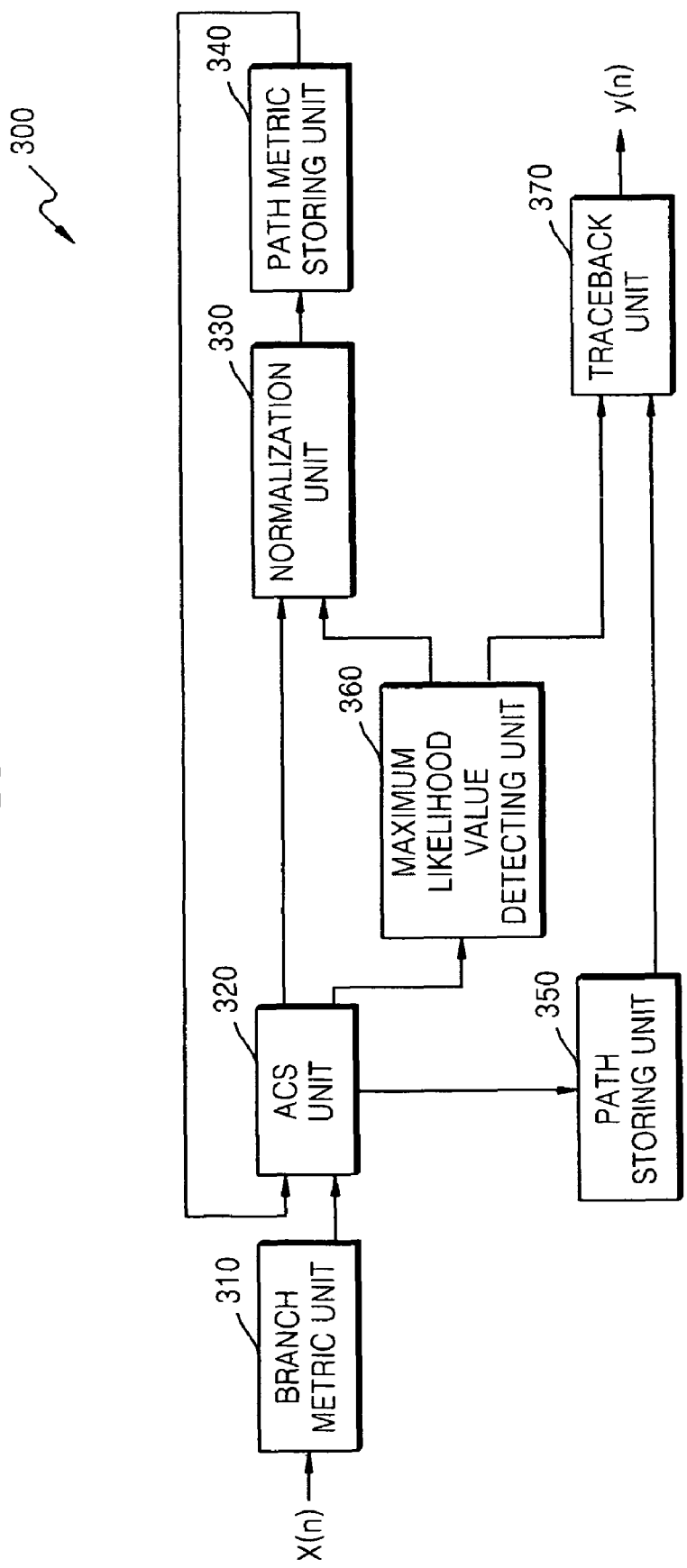
FIG. 3 is a block diagram of a forward Viterbi decoder of the forward equalizer of FIG. 2.

FIG. 3 is a block diagram of an embodiment of a forward Viterbi decoder 300 of the bidirectional equalizer 100 of FIG. 1.

The forward Viterbi decoder 300 uses an ML decoding method which selects only one of two paths which has a possibility in each state at a specific point of time and discards the path having no possibility. The selected path is called a survivor path, and each state of the survivor path preserves information on the survivor path as much as the determined decision path. Therefore, decoding is performed by selecting the greatest possible path from among survivor paths in each state and tracking it back.

Referring to FIG. 3, the forward Viterbi decoder 300 includes a branch metric unit 310, an add-compare-select (ACS) unit 320, a normalization unit 330, a path metric storing unit 340, a path storing unit 350, a maximum likelihood value detecting unit 360, and a traceback unit 370. The reverse Viterbi decoder 160 illustrated in FIG. 1 can be structurally identical to the forward Viterbi decoder 300.

The branch metric unit 310 receives an encoded data sequence x(n), and calculates a branch metric between the encoded data sequence and a reference value of each branch at every point of time in a trellis diagram. The ACS unit 320 adds and compares the branch metric output from the branch metric unit 310 and a path metric of a previous state output from the path metric storing unit 340, and selects a survivor path with a minimum path metric in each state.

The maximum likelihood value detecting unit 360 detects a survivor path being most possible from the survivor paths of the respective states output from the ACS unit 320. The normalization unit 330 subtracts the most possible survivor path from the survivor paths output from the ACS unit 320 in order to prevent data overflow.

The path storing unit 350 stores information on the survivor path in each state. The traceback unit 370 traces back the most possible survivor path output from the maximum likelihood value detecting unit 360 using a traceback algorithm and outputs a finally decoded data sequence y(n). Although not shown, the traceback unit 370 may include a plurality of multiplexers and registers.

Figure 4A:
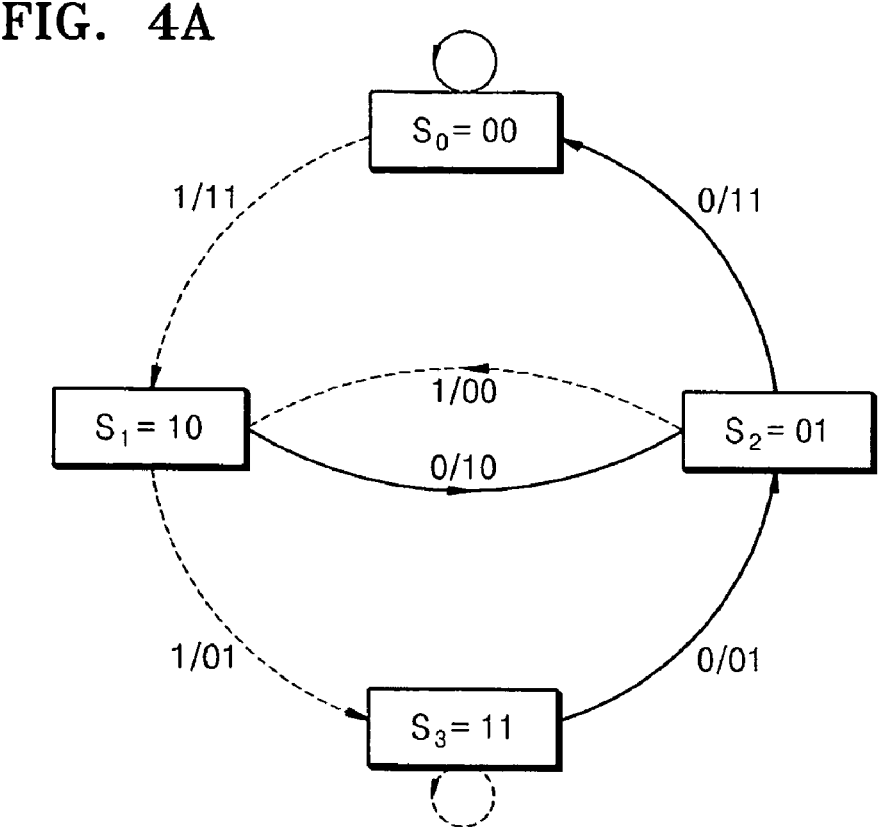
FIG. 4A is a state diagram of a convolutional encoder used in a forward Viterbi decoder of the bidirectional equalizer of FIG. 1.
Figure 4B:
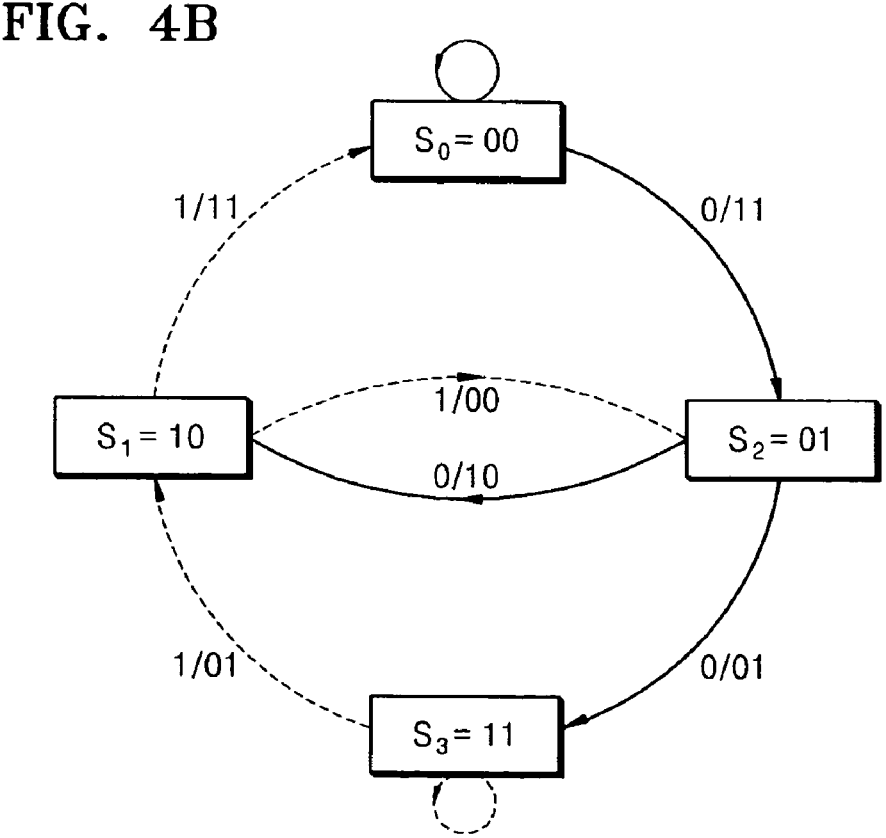
FIG. 4B is a state diagram of a convolutional encoder used in a reverse Viterbi decoder of the bidirectional equalizer of FIG. 1.

FIG. 4A is a state diagram of a (n, k) convolutional encoder used in a forward Viterbi decoder of the bidirectional equalizer of FIG. 1. FIG. 4B is a state diagram of a (n, k) convolutional encoder used in a reverse Viterbi decoder of the bidirectional equalizer of FIG. 1. The state diagrams of FIGS. 4A and 4B are exemplary and may be changed according to the code rate and the constraint length of the (n, k) convolutional encoder.

The (n, k) convolutional encoder is a finite state machine that generates n bits for every k bits, and has a code rate of k/n. FIGS. 4A and 4B are state diagrams of a convolutional encoder with a code rate r of 1/2 and a constraint length k of 3. The state diagrams of FIGS. 4A and 4B illustrate the operation of the convolutional encoder according to the states of a memory. Meanwhile, a trellis diagram is a state transition diagram that is expanded in time.

Referring to FIGS. 4A and 4B, states $S_0$, $S_1$, $S_2$, and $S_3$ of the memory are represented by '00', '10', '01', and '11', respectively. An outgoing arrow in each state indicates a state transition to a next state. For example, an arrow going from the state $S_1$ to the state $S_3$ indicates that when the state of the convolutional encoder is '10' and an input is '1', an output is '10' and the next state of the convolutional encoder is '11'.

The state diagram of FIG. 4B is structurally the same as the state diagram of FIG. 4A except that the directions of arrows indicating state transitions are opposite to each other. The state diagram of FIG. 4B is referred to as a reverse state diagram. The reverse Viterbi decoder performs decoding using the reverse state diagram.

Figure 5:
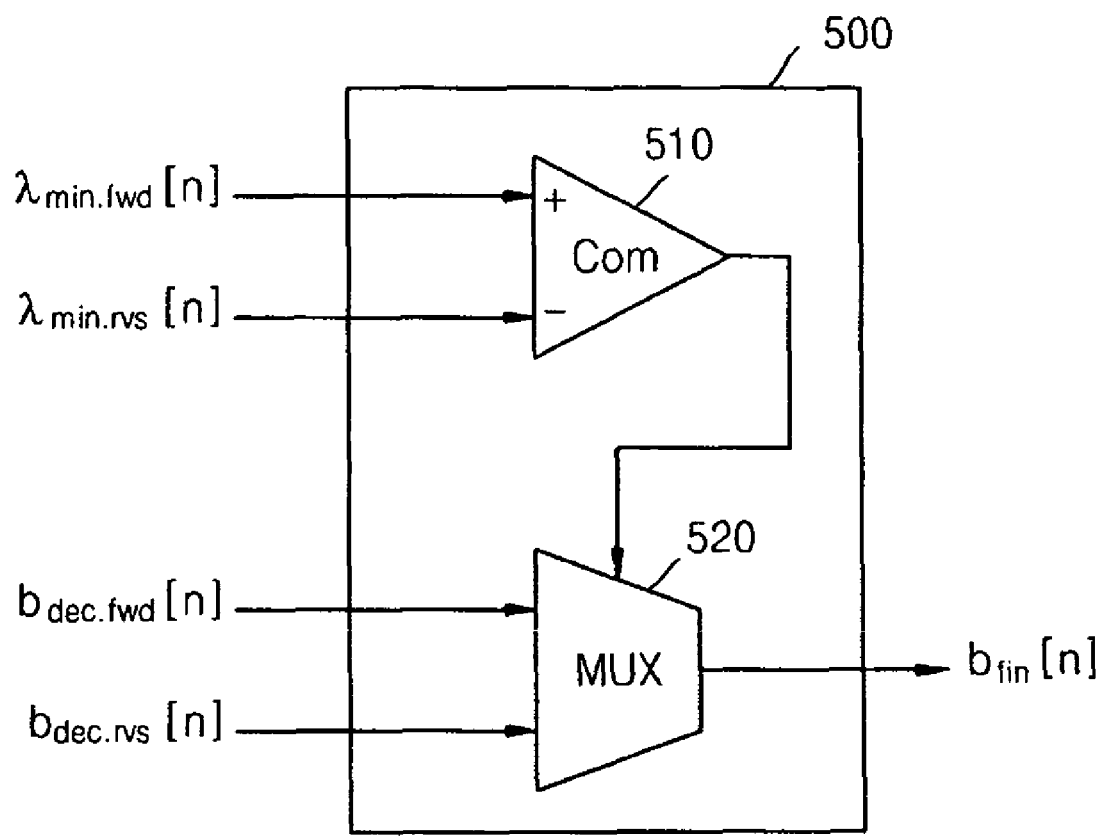
FIG. 5 is a block diagram of an arbitrator of the bidirectional equalizer of FIG. 1.

FIG. 5 is a block diagram of an exemplary embodiment of an arbitrator 500 of the bi-directional equalizer of FIG. 1.

Referring to FIG. 5, the arbitrator 500 includes a comparator 510 and a multiplexer 520. The comparator 510 compares a first minimum path metric $\lambda_{min.fwd}$ and a second minimum path metric $\lambda_{min.rvs}$ respectively received from the forward Viterbi decoder 150 and the reverse Viterbi decoder 160 of FIG. 1. The comparator 510 outputs a control signal SEL controlling the multiplexer 520 according to the comparison result. When a data sequence transmitted from a transmitter consists of n data symbols, the comparator 510 makes n comparisons and n control signal generations.

The comparator 510 outputs a control signal SEL with a first logic state when the first minimum path metric $\lambda_{min.fwd}$ is less than the second minimum path metric $\lambda_{min.rvs}$, outputs a control signal SEL with a second logic state when the first minimum path metric $\lambda_{min.fwd}$ is greater than the second minimum path metric $\lambda_{min.rvs}$, and outputs a control signal SEL with a first logic state or a second logic state when the first minimum path metric $\lambda_{min.fwd}$ is equal to the second minimum path metric $\lambda_{min.rvs}$.

The multiplexer (mux) 520 receives a first decided candidate data sequence $b_{dec.fwd}[n]$ and a second decided candidate data sequence $b_{dec.rvs}[n]$ respectively output from the second delay element 170 and the second time reverse element 180 of FIG. 1, and outputs one data symbol contained in the first decided candidate data sequence $b_{dec.fwd}[n]$ or one data symbol contained in the second decided candidate data sequence $b_{dec.rvs}[n]$ in response to the control signal SEL. After repeating the above process n times, the multiplexer 520 outputs a finally decided data sequence $b_{fin}[n]$.

Figure 6:
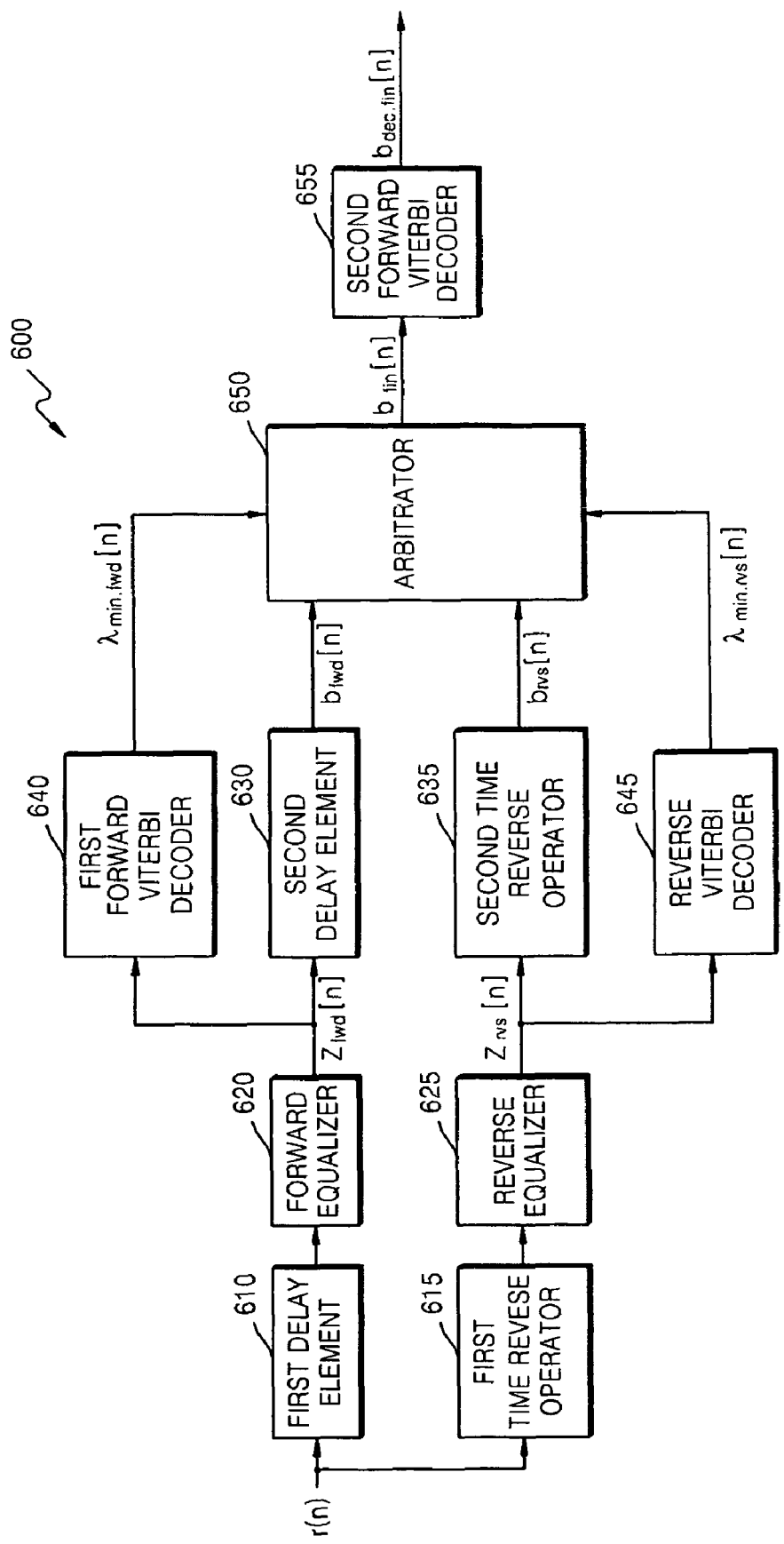
FIG. 6 is a block diagram of a bidirectional equalizer according to another embodiment of the present general inventive concept.

FIG. 6 is a block diagram of a bidirectional equalizer 600 according to another embodiment of the present general inventive concept.

Referring to FIG. 6, the bidirectional equalizer 600 includes a first delay element 610, a first time reverse operator 615, a forward equalizer 620, a reverse equalizer 625, a second delay element 630, a second time reverse operator 635, a first forward Viterbi decoder 640, a reverse Viterbi decoder 645, an arbitrator 650, and a second forward Viterbi decoder 655.

The bidirectional equalizer 600 will now be explained focusing on the second delay element 630, the second reverse operator 635, the first deciding unit 640, the second deciding unit 645, the first forward Viterbi decoder 640, the reverse Viterbi decoder 645, the arbitrator 650, and the second forward Viterbi decoder 655 which are different from the elements of the bidirectional equalizer of FIG. 1.

The second delay element 630 delays a first candidate data sequence $Z_{fwd}[n]$ received from the forward equalizer 620 for a predetermined period of time, and compensates for a delay through the second time reverse operator 635. The second time reverse operator 635 reverses the order of a second candidate sequence $Z_{rvs}[n]$ received from the reverse equalizer 625 in time and outputs the reversed second candidate sequence $Z_{rvs}[n]$.

The second delay element 630 and the second time reverse operator 635 of FIG. 6 are similar to the second delay element 170 and the second time reverse operator 180 of FIG. 1, except that the second delay element 630 delays a data sequence for a predetermined period of time and the second time reverse operator 635 reverses the order of a data sequence before the data sequence is decoded.

Although not illustrated in FIG. 6, a deciding unit including a slicer may be disposed between the second delay element 630 and the arbitrator 650 and between the second time reverse operator 635 and the arbitrator 650. Quantization is a procedure of constraining the logic level of an input data sequence to one reference level of a plurality of reference levels.

The first forward Viterbi decoder 640 outputs n first minimum path metrics $\lambda_{min.fwd}[n]$ calculated by ML to the arbitrator 650, and the reverse Viterbi decoder 645 outputs n second minimum path metrics $\lambda_{min.rvs}[n]$ calculated by ML to the arbitrator 650.

The first forward Viterbi decoder 640 and the reverse Viterbi decoder 645 respectively output n first minimum path metrics $\lambda_{min.fwd}[n]$ and n second minimum path metrics $\lambda_{min.rvs}[n]$ calculated in decoding an encoded data sequence consisting of n data symbols using a Viterbi algorithm. The first forward Viterbi decoder 640 and the reverse Viterbi decoder 645 do not directly decode and output the encoded data sequence. That is, the first forward Viterbi decoder 640 and the reverse Viterbi decoder 645 output only the first minimum path metrics $\lambda_{min.fwd}[n]$ and second minimum path metrics $\lambda_{min.rvs}[n]$, respectively.

The arbitrator 650 receives a decoded first decided candidate data sequence $b_{dec.fwd}[n]$ from the second delay element 630 and a decoded second decided candidate data sequence $b_{dec.rvs}[n]$ from the second time reverse operator 635. Also, the arbitrator 650 receives the first minimum path metrics $\lambda_{min.fwd}[n]$ from the first forward Viterbi decoder 640 and the second minimum path metrics $\lambda_{min.rvs}[n]$ from the reverse Viterbi decoder 645.

In outputting the respective data symbols, the arbitrator 650 compares the first minimum metrics $\lambda_{min.fwd}$ with the second minimum path metrics $\lambda_{min.rvs}$, and outputs one data symbol contained in the decoded first decided candidate data sequence $b_{dec.fwd}[n]$ or one data symbol contained in the decoded second decided candidate data sequence $b_{dec.rvs}[n]$. After repeating the above procedure n times, the arbitrator 650 outputs a finally decided data sequence $b_{fin}[n]$ consisting of n data symbols.

The second forward Viterbi decoder 655 receives the finally decided data sequence $b_{fin}[n]$ from the arbitrator 650, decodes the finally decided data sequence $b_{fin}[n]$ for every data symbol using third minimum path metrics calculated by ML, and outputs the decoded finally decided data sequence $b_{dec.fin}[n]$.

Figure 7:
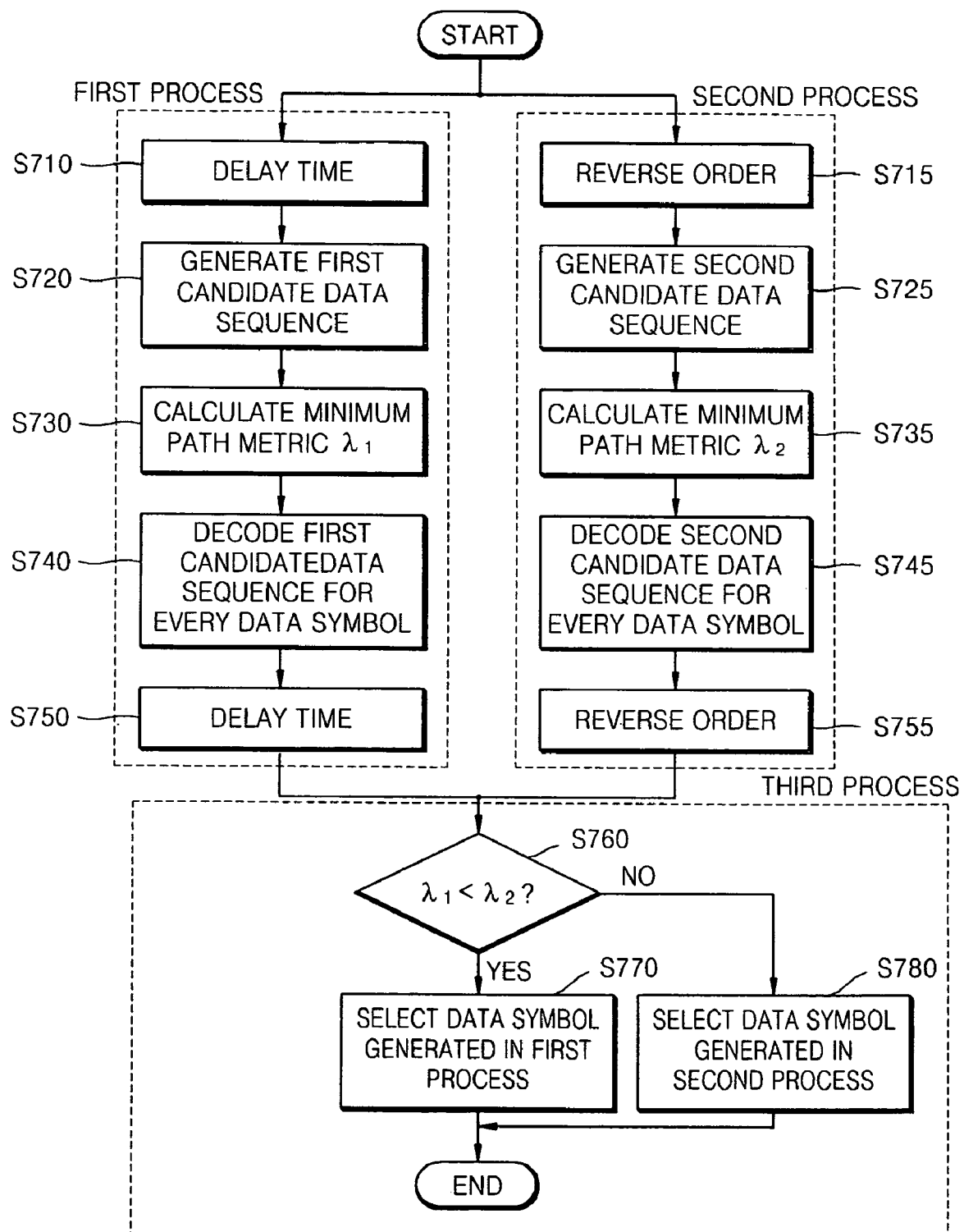
FIG. 7 is a flowchart illustrating an equalization method according to an embodiment of the present general inventive concept.

FIG. 7 is a flowchart illustrating an equalization method according to an embodiment of the present general inventive concept.

The equalization method includes three processes, and the first and second processes are performed simultaneously. Each of operations constituting the first process is performed at the same time as each of operations constituting the second process.

First Process

In operation S710, a data sequence transmitted from a transmitter is delayed for a predetermined period of time. In operation S720, inter-symbol interference present in the data sequence is eliminated and a first candidate data sequence is generated. In operation S730, a minimum path metric $\lambda_1$ for each data symbol is calculated in order to decode the first candidate data sequence. In operation S 740, the first candidate data sequence is decoded for every data symbol using the calculated minimum path metric $\lambda_1$. In operation S750, the decoded first candidate data sequence is delayed for a predetermined period of time.

Second Process

In operation S715, the order of the data sequence transmitted from the transmitter is reversed. In operation S725, inter-symbol interference present in the reversed data sequence is eliminated and a second candidate data sequence is generated. In operation S735, a minimum path metric $\lambda_2$ for each data symbol is calculated in order to decode the second candidate data sequence. In operation S745, the second candidate data sequence is decoded for every data symbol using the calculated minimum path metric 2. In operation S755, the order of the decoded second candidate data sequence is reversed.

Third Process

In operation S760, the minimum path metric $\lambda_1$ calculated in operation S730 is compared with the minimum path metric $\lambda_2$ calculated in operation S735. In operation S770, a data symbol contained in the data sequence generated in the first process is selected when the minimum path metric $\lambda_1$ is less than the minimum path metric $\lambda_2$. In operation S780, a data symbol contained in the data sequence generated in the second process is selected when the minimum path metric $\lambda_1$ is not less than the minimum path metric $\lambda_2$.

Figure 8:
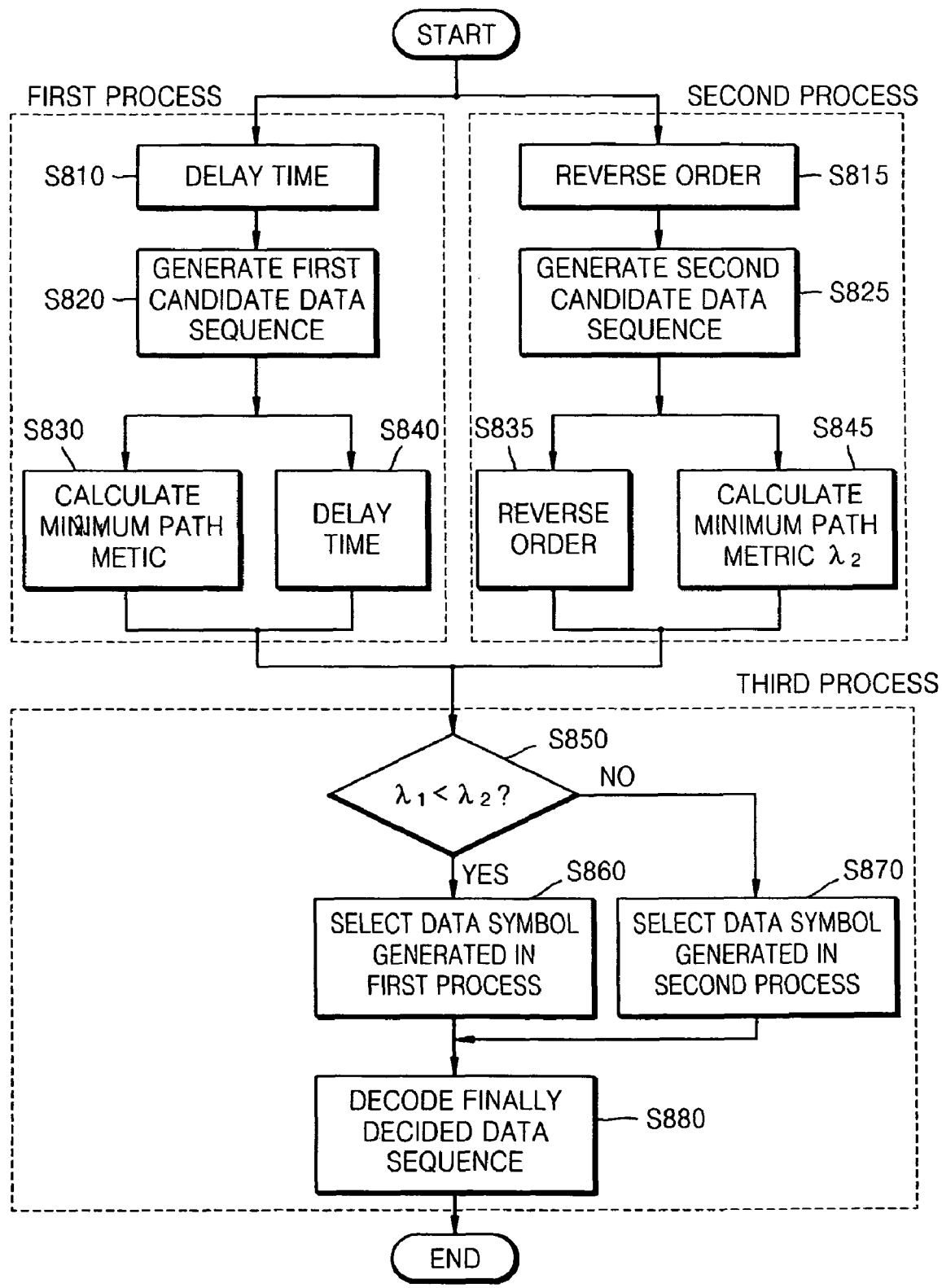
FIG. 8 is a flowchart illustrating an equalization method according to another embodiment of the present general inventive concept.

FIG. 8 is a flowchart illustrating an equalization method according to another embodiment of the present general inventive concept.

Similar to FIG. 7, the equalization method of FIG. 8 includes three processes, and the first and second processes are performed simultaneously. Also, each of operations constituting the first process is performed at the same time as each of operations constituting the second process.

(1) First Process

In operation S810, a data sequence transmitted from a transmitter is delayed for a predetermined period of time. In operation S820, inter-symbol interference present in the data sequence is eliminated and a first candidate data sequence is generated. In operation S830, a minimum path metric $\lambda_1$ for each data symbol is calculated in order to decode the first candidate data sequence. In operation S840, the first candidate data sequence is delayed for a predetermined period of time. Operations S830 and operation S840 are performed simultaneously.

(2) Second Process

In operation S815, the order of the data sequence transmitted from the transmitter is reversed. In operation S825, inter-symbol interference present in the reversed data sequence is eliminated and a second candidate data sequence is generated. In operation S835, the second candidate data sequence is delayed for a predetermined period of time. In operation S845, a minimum path metric $\lambda_2$ for each data symbol is calculated in order to decode the second candidate data sequence. Operation S835 and operation S845 are performed simultaneously.

(3) Third Process

In operation S850, the minimum path metric $\lambda_1$ calculated in operation S830 is compared with the minimum path metric $\lambda_2$ calculated in operation S845. In operation S860, a data symbol contained in the data sequence generated in the first process is selected when the minimum path metric $\lambda_1$ is less than the minimum path metric $\lambda_2$. In operation S870, a data symbol contained in the data sequence generated in the second process is selected when the minimum path metric $\lambda_1$ is not less than the minimum path metric $\lambda_2$.

Figures 9, 10:
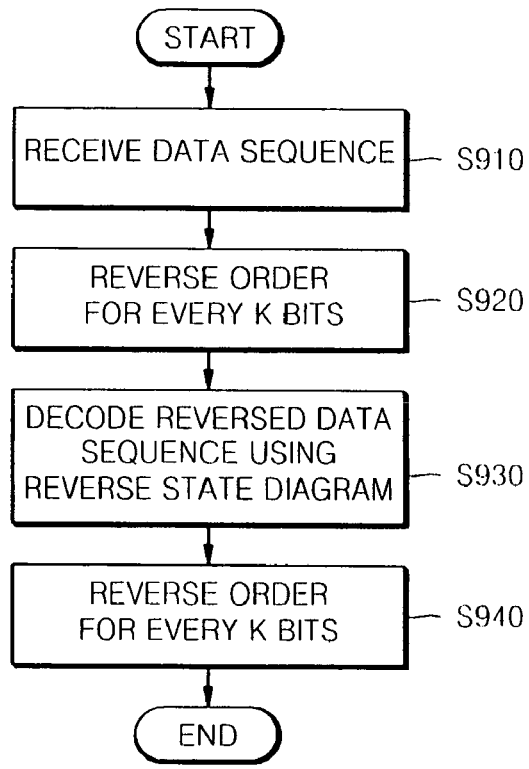
FIG. 9 is a flowchart illustrating a reverse Viterbi decoding method according to an embodiment of the present general inventive concept.
FIG. 10 is a table illustrating an example of a reverse Viterbi decoding method.

FIG. 9 is a flowchart illustrating a reverse Viterbi decoding method according to an embodiment of the present general inventive concept.

In operation S910, a data sequence is received. The data sequence is an encoded data sequence. In operation S920, the order of the received data sequence is reversed for every K bits. In operation S930, the data sequence reversed for every k bits is decoded using a reverse state diagram as illustrated in FIG. 4B. In operation S940, the order of the decoded data sequence is reversed for every K bits and the reversed decoded data sequence is output.

FIG. 10 is a table illustrating an example of a reverse Viterbi decoding method.

When it is assumed that a random data sequence generated at a transmitter is 0 1 0 0 1, a data sequence encoded by a (2, 1) convolutional encoder is 00 11 10 00 01. When the encoded data sequence is passed through an ideal channel with no inter-symbol interference or no noise, a received data sequence is 00 11 10 00 01. When the order of the received data sequence is reversed, the reversed data sequence is 10 00 01 11 00.

Since the reverse Viterbi decoding method performs decoding after reversing the order of an input data sequence for every 2 bits, the data sequence reversed for every 2 bits is 01 00 10 11 00. Since the reverse Viterbi decoding method performs outputting after reversing the order of the decoded data sequence for every 2 bits, the data sequence reversed again for every 2 bits is 10 00 01 11 00.

As described above, since the bidirectional equalizer and the equalization method according to the various embodiments of the present general inventive concept selects only data symbols with the lowest error probability among data sequences output from a forward equalizer and a reverse equalizer using minimum path metrics and outputs a data sequence consisting of only the data symbols with the lowest error probability, equalization efficiency can be improved.

Moreover, unlike a conventional bidirectional equalizer and a conventional equalization method, since the bidirectional equalizer and the equalization method according to the various embodiments of the present general inventive concept do not use a training sequence in order to estimate channel characteristics, the bidirectional equalizer and the equalization method can be used even when channel characteristics are changed over time. Since the bidirectional equalizer and the equalization method according to the various embodiments disclosed here in use a Viterbi decoder that is used in a conventional receiver, equalization efficiency can be improved without increasing a circuit area.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A bidirectional equalizer comprising:
   a first equalizer to eliminate inter-symbol interference present in a data sequence transmitted from a transmitter and to generate a first candidate data sequence;
   a first time reverse operator to reverse the order of the transmitted data sequence and to generate a reversed data sequence;
   a second equalizer to eliminate inter-symbol interference present in the reversed data sequence and to generate a second candidate data sequence;
   a forward Viterbi decoder to receive the first candidate data sequence, and to decode and output the first candidate data sequence for every data symbol using a first minimum path metric calculated by a maximum likelihood (ML);
   a reverse Viterbi decoder to receive the second candidate data sequence, and to decode and output the second candidate data sequence for every data symbol using a second minimum path metric calculated by the ML;

a second time reverse operator to reverse the order of the decoded second candidate data sequence output from the reverse Viterbi decoder and to output the reversed decoded second candidate sequence; and an arbitrator to compare the first minimum path metric with the second minimum path metric, and to selectively output an output of the forward Viterbi decoder or an output of the second time reverse operator according to the comparison result.

2. The bidirectional equalizer of claim 1, wherein the arbitrator selects the output of the forward Viterbi decoder when the first minimum path metric is less than the second minimum path metric, and selects the output of the second time reverse operator when the first minimum path metric is greater than the second minimum path metric.

3. The bidirectional equalizer of claim 1, wherein the first and second minimum path metrics are determined based on a Hamming distance or a Euclidean distance.

4. The bidirectional equalizer of claim 1, wherein the reverse Viterbi decoder reverses the order of the second candidate data sequence for every K bits, decodes the second candidate data sequence, which is reversed for every K bits, reverses the order of the decoded reversed second candidate data sequence for every K bits, and outputs the reversed decoded reversed second candidate data sequence where K is a natural number.

5. The bidirectional equalizer of claim 4, wherein the K bits are 2 bits.

6. The bidirectional equalizer of claim 1, further comprising:

a first delay element to deliver the transmitted data sequence to the first equalizer, and having a delay time equal to an operation time of the first time reverse operator; and a second delay element to deliver the output of the forward Viterbi decoder to the arbitrator, and having a delay time equal to an operation time of the second time reverse operator.

7. The bi-directional equalizer of claim 1, wherein the first equalizer further comprises:

a forward filter to filter the signal input to the first equalizer;

a backward filter to filter a signal output from the multiplexer; and a subtractor to subtract the signal output from the backward filter from the signal output from the forward filter, wherein the deciding unit receives as an input signal an output signal of the subtractor.

8. A bidirectional equalizer comprising:

a first equalizer to eliminate inter-symbol interference present in a data sequence transmitted from a transmitter and to generate a first candidate data sequence;

a first time reverse operator to reverse the order of the transmitted data sequence and to generate a reversed data sequence;

a second equalizer to eliminate inter-symbol interference present in the reversed data sequence and to generate a second candidate data sequence;

a first forward Viterbi decoder to receive the first candidate data sequence, and to output a first minimum path metric calculated by a maximum likelihood ML when the first candidate data sequence is decoded for every data symbol;

a reverse Viterbi decoder to receive the second candidate data sequence, and to output a second minimum path metric calculated by the ML when the second candidate data sequence is decoded for every data symbol;

a second time reverse operator to reverse the order of the second candidate data sequence and to output the reversed second candidate data sequence; and an arbitrator to compare the first minimum path metric with the second minimum path metric, and to select and output an output of the first equalizer or an output of the second time reverse operator according to the comparison result.

9. The bidirectional equalizer of claim 8, further comprising:

a second forward Viterbi decoder to receive an output from the arbitrator, and to decode and output the output of the arbitrator for every data symbol using a third minimum path metric calculated by ML.

10. The bidirectional equalizer of claim 9, further comprising:

a first deciding unit to quantize and output an output of the first equalizer; and a second deciding unit to quantize and output an output of the second time reverse operator, wherein the arbitrator selects and outputs an output of the first deciding unit or an output of the second deciding unit.

11. The bidirectional equalizer of claim 9, further comprising:

a first delay element to deliver the transmitted data sequence to the first equalizer, and having a delay time equal to an operation time of the first time reverse operator; and a second delay element to deliver the output of the first equalizer to the arbitrator, and having a delay time equal to an operation time of the second time reverse operator.

12. A bidirectional equalizer comprising:

a first equalizer to eliminate inter-symbol interference present in a data sequence transmitted from a transmitter and to generate a first candidate data sequence;

a first time reverse operator to reverse the order of the transmitted data sequence and to generate a reversed data sequence;

a second equalizer to eliminate inter-symbol interference present in the reversed data sequence and to generate a second candidate data sequence;

a first forward Viterbi decoder to receive the first candidate data sequence, and to decode and output the first candidate data sequence for every data symbol using a first branch metric calculated by a maximum likelihood ML;

a reverse Viterbi decoder to receive the second candidate data sequence, and to decode and output the second candidate data sequence using a second branch metric calculated by the ML;

a second time reverse operator to reverse the order of the second candidate data sequence and output the reversed second candidate data sequence; and an arbitrator to compare the first branch metric with the second branch metric, and to select and output an output of the first equalizer or an output of the second time reverse operator according to the comparison result.

13. An equalization method comprising:

(a) eliminating inter-symbol interference present in a data sequence transmitted from a transmitter and outputting the data sequence;

(b) reversing the order of the transmitted data sequence and generating a reversed data sequence;

(c) eliminating interference present in the reversed data sequence and outputting the reversed data sequence;

(d) decoding and outputting the data sequence output in operation (a) for every data symbol using a first minimum path metric calculated by a maximum likelihood (ML);

(e) decoding and outputting the data sequence output in operation (c) for every data symbol using a second minimum path metric calculated by the ML;

(f) reversing the order of the data sequence output in operation (e) and outputting the reversed data sequence;

(g) comparing the first minimum path metric with the second minimum path metric; and (h) selecting and outputting a data symbol generated in operation (d) or a data symbol generated in operation (f) according to the comparison result.

14. The equalization method of claim 13, wherein operation (h) comprises selecting and outputting the data symbol generated in operation (d) when the first minimum path metric is less than the second minimum metric, and selecting and outputting the data symbol generated in operation (f) when the first minimum path metric is greater than the second minimum metric.

15. The equalization method of claim 13, wherein operation (e) comprises:
 (e1) reversing the order of the second candidate data sequence for every K bits where K is a natural number;
 (e2) decoding the data sequence generated in operation (e1) for every data symbol; and
 (e3) reversing the order of the data sequence generated in operation (e2) for every K bits and outputting the reversed data sequence.

16. The equalization method of claim 15, wherein the K bits are 2 bits.

17. The equalization method of claim 13, wherein the first and second minimum metrics are determined based on a Hamming distance or a Euclidean distance.

18. An equalization method comprising:
(a) eliminating inter-symbol interference present in a data sequence transmitted from a transmitter and outputting the data sequence;

(b) reversing the order of the transmitted data sequence and generating a reversed data sequence;

(c) eliminating inter-symbol interference present in the reversed data sequence and outputting the reversed data sequence;

(d) outputting a first minimum path metric calculated by a maximum likelihood (ML) for every data symbol, when decoding the data sequence output in operation (a);

(e) outputting a second minimum path metric calculated by the ML for every data symbol, when decoding the data sequence output in operation (c);

(f) reversing the order of the data sequence output in operation (e) and outputting the reversed data sequence;

(g) comparing the first minimum path metric with the second minimum path metric; and (h) selecting and outputting a data symbol generated in operation (a) or a data symbol generated in operation (f) according to the comparison result.

19. An equalization method comprising:
(a) eliminating inter-symbol interference present in data sequence transmitted from a transmitter and outputting the data sequence;

(b) reversing the order of the transmitted data sequence and generating a reversed data sequence;

(c) eliminating inter-symbol interference present in the reversed data sequence and outputting the reversed data sequence;

(d) outputting a first branch metric calculated by ML for every data symbol, when decoding the data sequence output in operation (a);

(e) outputting a second branch metric calculated by ML for every data symbol, when decoding the data sequence output in operation (c);

(f) reversing the order of the data sequence output in operation (e) and outputting the reversed data sequence;

(g) comparing the first branch metric with the second branch metric; and (h) selecting and outputting a data symbol generated in operation (a) or a data symbol generated in operation (f) according to the comparison result.

* * * * *